United States Patent
Yu et al.

(10) Patent No.: US 9,153,014 B2
(45) Date of Patent: Oct. 6, 2015

(54) IMAGE CORRECTION METHOD AND RELATED IMAGE CORRECTION SYSTEM THEREOF

(75) Inventors: Chi-Chang Yu, Keelung (TW); Meng-Chun Lin, Taipei (TW); Homer H. Chen, Taichung (TW)

(73) Assignee: Avisonic Technology Corporation, Science-Based Industrial Park, Hsin-Chu (TW)

( * ) Notice: Subject to any disclaimer, the term of this patent is extended or adjusted under 35 U.S.C. 154(b) by 812 days.

(21) Appl. No.: 13/091,137

(22) Filed: Apr. 21, 2011

(65) Prior Publication Data
US 2012/0114262 A1 May 10, 2012

(30) Foreign Application Priority Data
Nov. 9, 2010 (TW) .............................. 099138502 A

(51) Int. Cl.
*G06K 9/32* (2006.01)
*G06T 5/00* (2006.01)

(52) U.S. Cl.
CPC ....... *G06T 5/006* (2013.01); *G06T 2207/20021* (2013.01)

(58) Field of Classification Search
CPC ...................................................... G06T 3/0018
USPC .................................................. 382/103, 254
See application file for complete search history.

(56) References Cited

U.S. PATENT DOCUMENTS

| | | | | |
|---|---|---|---|---|
| 4,790,028 A | * | 12/1988 | Ramage | 382/298 |
| 5,185,667 A | * | 2/1993 | Zimmermann | 348/207.99 |
| 5,313,306 A | * | 5/1994 | Kuban et al. | 348/65 |
| 5,359,363 A | * | 10/1994 | Kuban et al. | 348/36 |
| 5,796,426 A | * | 8/1998 | Gullichsen et al. | 348/207.99 |
| RE36,207 E | * | 5/1999 | Zimmermann et al. | 348/207.99 |
| 5,903,319 A | * | 5/1999 | Busko et al. | 348/607 |
| 6,496,192 B1 | * | 12/2002 | Shreesha et al. | 345/540 |
| 6,603,502 B2 | * | 8/2003 | Martin et al. | 348/36 |
| 6,819,323 B2 | * | 11/2004 | Sunaga | 345/530 |
| 7,061,497 B2 | * | 6/2006 | Kim et al. | 345/531 |
| 7,340,558 B2 | * | 3/2008 | Lee et al. | 711/5 |
| 7,474,799 B2 | * | 1/2009 | Bassi et al. | 382/275 |
| 7,714,936 B1 | * | 5/2010 | Martin et al. | 348/576 |
| 7,852,376 B2 | * | 12/2010 | Chen et al. | 348/218.1 |
| 7,893,972 B2 | * | 2/2011 | Kaplinsky et al. | 348/246 |
| 2001/0017628 A1 | * | 8/2001 | Sunaga | 345/571 |
| 2001/0055427 A1 | * | 12/2001 | Freeman | 382/233 |
| 2002/0063802 A1 | * | 5/2002 | Gullichsen et al. | 348/607 |
| 2004/0076336 A1 | * | 4/2004 | Bassi et al. | 382/274 |
| 2004/0263523 A1 | * | 12/2004 | Satoh et al. | 345/530 |
| 2006/0007235 A1 | * | 1/2006 | Chi | 345/531 |

(Continued)

FOREIGN PATENT DOCUMENTS

| | | |
|---|---|---|
| CN | 1963838 A | 5/2007 |
| CN | 101031052 A | 9/2007 |

(Continued)

*Primary Examiner* — Gandhi Thirugnanam
(74) *Attorney, Agent, or Firm* — Winston Hsu; Scott Margo

(57) ABSTRACT

The present invention provides an image correction method and a related image correction system which can correct images captured via a fisheye lens or a ultra-wide angle lens camera so as to alleviate geometrical distortion in the images, and geometrically adjust the images according to user's requirements. Wherein, the present invention further enhances the processing performance of image correction computation by a memory allocation technique.

6 Claims, 8 Drawing Sheets

(56) References Cited

U.S. PATENT DOCUMENTS

| | | |
|---|---|---|
| 2006/0110050 A1* | 5/2006 | Aoyama et al. ............... 382/232 |
| 2007/0171288 A1* | 7/2007 | Inoue et al. ................... 348/241 |
| 2007/0236595 A1* | 10/2007 | Pan et al. ...................... 348/335 |
| 2008/0129723 A1* | 6/2008 | Comer et al. ................. 345/419 |
| 2008/0144968 A1* | 6/2008 | Cohen et al. ................. 382/276 |
| 2008/0158226 A1* | 7/2008 | Shimizu ....................... 345/420 |
| 2009/0058866 A1* | 3/2009 | Chou et al. ................... 345/544 |
| 2009/0087115 A1* | 4/2009 | Wong et al. .................. 382/255 |
| 2010/0111440 A1* | 5/2010 | Chai et al. .................... 382/275 |
| 2010/0119172 A1* | 5/2010 | Yu et al. ....................... 382/256 |
| 2010/0254602 A1* | 10/2010 | Yoshino ........................ 382/167 |
| 2011/0007129 A1* | 1/2011 | Martin et al. ................... 348/36 |
| 2011/0194606 A1* | 8/2011 | Hsieh et al. ............. 375/240.16 |
| 2012/0045100 A1* | 2/2012 | Ishigami et al. ............. 382/106 |
| 2012/0114262 A1* | 5/2012 | Yu et al. ....................... 382/254 |
| 2012/0147023 A1* | 6/2012 | Cho et al. ..................... 345/557 |

FOREIGN PATENT DOCUMENTS

| | | | |
|---|---|---|---|
| CN | 101742125 A | 6/2010 | |
| CN | 101755285 A | 6/2010 | |
| EP | 1600890 A2 * | 11/2005 | ............... G06T 5/00 |
| JP | H05101221 A | 4/1993 | |
| JP | H0636020 A | 2/1994 | |
| JP | H06334869 A | 12/1994 | |
| JP | H0915303 A | 1/1997 | |
| JP | 200456570 A | 2/2004 | |
| JP | 2006345054 A | 12/2006 | |
| JP | 200861172 A | 3/2008 | |
| JP | 2010118040 A | 5/2010 | |
| JP | 2010124164 A | 6/2010 | |
| TW | 201019715 | 5/2010 | |
| WO | 2010032720 A1 | 3/2010 | |

* cited by examiner

IMAGE CORRECTION METHOD AND RELATED IMAGE CORRECTION SYSTEM THEREOF

BACKGROUND OF THE INVENTION

1. Field of the Invention

The present invention relates to image processing, and more particularly, to an image processing method for correcting geometrical distortion caused by fisheye lens or ultra-wide angle lens and related image processing system.

2. Description of the Prior Art

Fisheye lens and ultra-wide angle lens are widely used in monitor cameras or general digital cameras. Though this type of camera may capture a scene that is in a quite large angle of view, the captured image is often accompanied with severe geometrical distortion, which will make a user unable to recognize some details in the captured image easily and clearly. In a worst case, the user may fail to recognize the image details due to the geometrical distortion. Therefore, images generated by fisheye lens and ultra-wide angle lens should be restored to images conforming to the original scenes for user's viewing by being processed by proper image processing techniques.

SUMMARY OF THE INVENTION

Therefore, the present invention provides an image correction method and related correction system that are utilized for correcting an image captured via a camera with fisheye lens or ultra-wide angle lens so as to alleviate the geometrical distortion of the captured images. Moreover, the image processing method and related image processing system of the present invention utilize a memory allocation technique which refers to an arrangement characteristic of reference data to thereby enhance processing speed of interpolation computation employed in the image correction. Besides, as a coordinate transformation method is required for processing the geometrical distortion, the present invention further provides a parameter estimation method for parameters utilized in the coordinate transformation method. The complicated process of obtaining parameters may be simplified according to the parameter estimation method of the present invention.

According to a first aspect of the present invention, an image correction method is provided. The image correction method is utilized for outputting a corrected image according to a method to be corrected, wherein the corrected image includes a plurality of corrected pixel blocks. Moreover, the image correction method performs a plurality of pixel value computations, and each pixel value computation is utilized for generating a pixel value of each corrected pixel within the corrected pixel block. The pixel value computation includes: establishing a coordinate transformation relation between the image to be corrected and the corrected image, such that a first coordinate value of each corrected pixel within the corrected pixel block corresponds to a second coordinate value within the image to be corrected; according to the coordinate transformation relation, determining a pixel block to be corrected corresponding to the corrected pixel block, for selecting a pixel block to be processed which at least includes the pixel block to be corrected from the image to be corrected, wherein the pixel block to be processed has a plurality of rows of pixels to be processed; temporarily storing the pixel value of each pixel to be processed into a memory device that has a plurality of memory banks, respectively, wherein the pixel value of different rows of pixels to be processed are temporarily stored into different memory banks of the memory device, respectively; and utilizing the second coordinate value corresponding to the corrected pixel for determining a plurality of specific pixels to be processed corresponding to the corrected pixel, and performing an interpolation computation when the memory device reads a plurality of pixel values of the plurality of specific pixels to be processed, for generating a pixel value of the corrected pixel. The plurality of pixel values of the plurality of specific pixels to be processed are stored into different memory banks, temporarily.

According to a second aspect of the present invention, an image correction method is provided. The image correction method is utilized for outputting a corrected image according to an image to be corrected, wherein the corrected image includes a plurality of corrected pixel blocks, and the image to be corrected is captured by a fisheye lens camera. Moreover, the image correction method performs a plurality of pixel value computations, and each pixel value computation is utilized for generating a pixel value of each corrected pixel within a corrected pixel block. The pixel value computation includes: establishing a coordinate transformation relation between the image to be corrected and the corrected image, such that a first coordinate value of each corrected pixel within the corrected pixel block corresponds to a second coordinate value within the image to be corrected, wherein the coordinate transformation relation is at least determined by a perspective distortion correction coordinate transformation, and within the perspective correction coordinate transformation, an angle parameter corresponding to an object plane and an image plane is determined by an incidence angle of an incident beam corresponding to the image to be corrected, and the incident beam transmits through an optical center of the fisheye lens; according to the coordinate transformation relation, determining a pixel block to be corrected corresponding to the corrected pixel block, for selecting a pixel block to be processed which at least includes the pixel block to be corrected from the image to be corrected; and utilizing the second coordinate value corresponding to the corrected pixel for determining a plurality of specific pixels to be processed corresponding to the corrected pixel, and utilizing the plurality of pixel values of the plurality of specific pixels to be processed to perform an interpolation computation, for generating a pixel value of the corrected pixel.

According to a third aspect of the present invention, an image correction system is provided. The image correction system is utilized for outputting a corrected image according to an image to be corrected. The corrected image includes a plurality of corrected pixel blocks, the image correction system performs a plurality of pixel value computations, and each pixel value computation is utilized for generating a pixel value of each corrected pixel within a corrected pixel block. The image correction system comprising: a coordinate transformation relation generating circuit, a block selecting circuit, a memory device and an interpolation computation circuit. The coordinate transformation relation generating circuit is utilized for establishing a coordinate transformation relation between the image to be corrected and the corrected image, such that a first coordinate value of each corrected pixel within the corrected pixel block corresponds to a second coordinate value within the image to be corrected. The block selecting circuit is coupled to the coordinate transformation relation generating circuit for according to the coordinate transformation relation, determining a pixel block to be corrected corresponding to the corrected pixel block, for selecting a pixel block to be processed which at least includes the pixel block to be corrected from the image to be corrected, wherein the pixel block to be processed has a plurality of rows of pixels to be processed. The memory device is coupled to the block selecting circuit and has a plurality of memory banks, for temporarily storing a pixel value of each pixel to be processed into the plurality of memory banks. The interpolation computation unit is coupled to the memory device and the coordinate transformation relation generating circuit, and utilizes the second coordinate value corresponding to the corrected pixel for determining the plurality of specific pixels to be processed corresponding to the corrected pixel, and performs an interpolation computation when the memory device reads the plurality of pixel values of the plurality of specific pixels to be processed, for generating a pixel value of the corrected pixel. The pixel values of different rows of the pixels to be processed are stored in different memory banks, temporarily.

According to a fourth exemplary embodiment of the present invention, an image correction system is provided. The image correction system is utilized for outputting a corrected image according to an image to be corrected, wherein the corrected image includes a plurality of corrected pixel blocks, and the image to be corrected is captured by a camera with fisheye lens. Moreover, the image correction system is utilized for performing a plurality of pixel value computations, and each pixel value computation is utilized for generating a pixel value of each corrected pixel within the corrected pixel block. The image correction system including: a coordinate transformation relation generating circuit, a block selecting circuit and an interpolation computation circuit. The coordinate transformation relation generating circuit is utilized for establishing a coordinate transformation relation between the image to be corrected and the corrected image, such that a first coordinate value of each corrected pixel within the corrected pixel block corresponds to a second coordinate value within the image to be corrected. The coordinate transformation relation generating circuit includes at least a perspective distortion correction coordinate transformation circuit, and the coordinate transformation relation is at least determined by the perspective distortion correction coordinate transformation circuit. An angle parameter utilized by the perspective correction coordinate transformation circuit corresponding to an object plane and an image plane is determined by an incidence angle of an incident beam corresponding to the image to be corrected, and the incident beam transmits through an optical center of the fisheye lens. The block selecting circuit is coupled to the coordinate transformation relation generating circuit for according to the coordinate transformation relation, determining a pixel block to be corrected corresponding to the corrected pixel block, for selecting a pixel block to be processed which at least includes the pixel block to be corrected from the image to be corrected. The interpolation computation circuit is coupled to the memory device and the coordinate transformation relation generating circuit, and utilizes the second coordinate value corresponding to the corrected pixel for determining the plurality of specific pixels to be processed corresponding to the corrected pixel, and utilizes the plurality of pixel values of the plurality of specific pixels to be processed to perform an interpolation computation for generating a pixel value of the corrected pixel.

These and other objectives of the present invention will no doubt become obvious to those of ordinary skill in the art after reading the following detailed description of the preferred embodiment that is illustrated in the various figures and drawings.

DETAILED DESCRIPTION

The final objective of the image correction of the present invention is to generate a corrected image by decreasing geometrical distortion of an image to be corrected that is captured by a camera with fisheye lens or ultra-wide angle lens. Before the corrected image is generated, the size of the corrected image has to be determined in advance (but it may be changed according to different requirements). Next, the corrected image is divided into a plurality of corrected pixel blocks that have the same size, and the corrected pixel blocks are processed by interpolation computation to thereby generate a pixel value (i.e., a grey value) of each pixel in each corrected pixel block one by one. Finally, the corrected image is output according to all computed pixel values.

Figure 1:
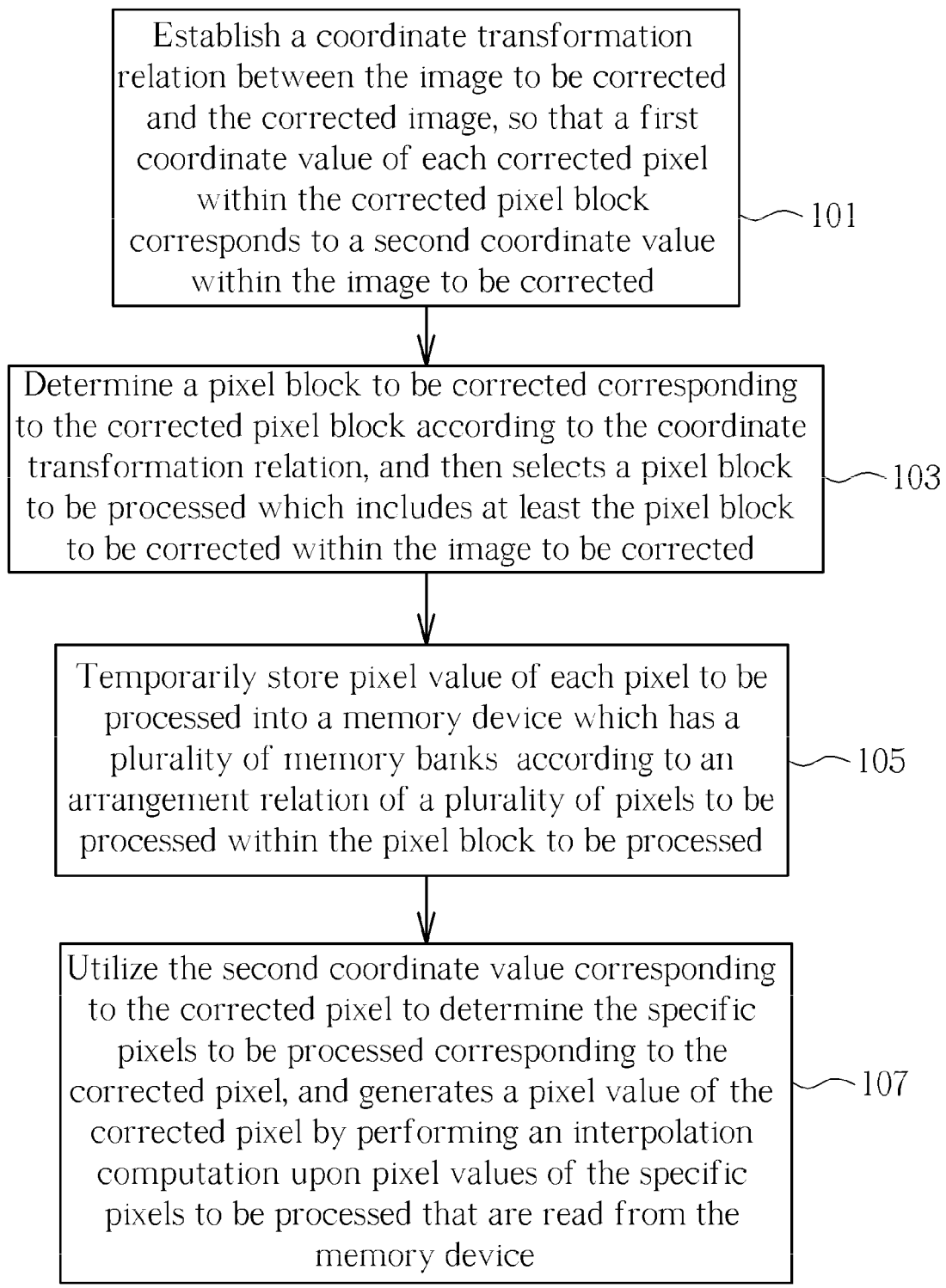
FIG. 1 is a flowchart illustrating an image correction method according to an exemplary embodiment of the present invention.

For example, the image correction of the present invention may predetermine a size of a corrected image to be 640*480 pixels, and divide the corrected image into 8*8 corrected pixel blocks that have the same size. Therefore, each pixel block to be corrected includes 80*60 pixels (Please note that the numbers listed here are for illustrated purposes only, and are not meant to be limitations of the present invention). In the corrected image, the interpolation computation for generating a pixel value of each corrected pixel requires to find out its related position (i.e., a coordinate value) within the image to be corrected via coordinate transformation. The interpolation computation further finds out a plurality of pixel values of a plurality of pixels adjacent to the related position according to the related position, and utilizes these pixel values to perform interpolation computation to determine the pixel value of the corrected pixel. Therefore, the image correction of the present invention has to perform a plurality of pixel value computations, wherein each pixel value computation will generate a pixel value of each corrected pixel within a corrected pixel block. Taking the numbers listed above for example, each pixel value computation will obtain 80*60 pixel values of the corrected pixels. Please refer to FIG. 1 for the detailed illustration of these operations. FIG. 1 is a flowchart illustrating a pixel value computation of the correction method of the present invention.

Please note that the flowchart shown in FIG. 1 only represents one of exemplary embodiments of the pixel value computation of the correction method according to the present invention. In other exemplary embodiments of the present invention, other steps different from the steps shown in FIG. 1 are may be included.

First, in step 101, the pixel value computation of the present invention establishes a coordinate transformation relation between the image to be corrected and the corrected image, so that a first coordinate value (Xc, Yc) of each corrected pixel within the corrected pixel block corresponds to a second coordinate value (Xd, Yd) within the image to be corrected. Taking FIG. 2 for example, a plurality of boundary pixels (i.e., the pixels included in dotted-line frame 201) of a corrected pixel block A within the corrected image obtain their related coordinate values (i.e., the pixels included in solid-line frame 202) within the image to be corrected via the coordinate transformation relation. In other words, the first coordinate value (Xc, Yc) of each corrected pixel included in the dotted-line frame 210 within the corrected image will be projected to a second coordinate value (Xd, Yd) within the image to be corrected. On the other hand, the image at the second coordinate value (Xd, Yd) within the image to be corrected will be restored via the coordinate transformation relation, and this image will be established at the position of the first coordinate value (Xc, Yc) within the corrected image. Therefore, the coordinate transformation relation determines the improvement of the geometrical distortion.

Next, after the coordinate transformation relation is established, step 103 determines a pixel block to be corrected corresponding to the corrected pixel block according to the coordinate transformation relation, and then selects a pixel block to be processed which includes at least the pixel block to be corrected within the image to be corrected. In detail, the coordinate transformation relation may obtain the related coordinate (i.e., the second coordinate value) of each corrected pixel within the corrected pixel block in the image to be corrected. Therefore, if it is required to find out pixel values of all corrected pixels within the corrected pixel block, the related coordinate is needed for determining which part of the image to be corrected to which the corrected pixel block is related (i.e., which part of a restored image for the image to be corrected that is represented by the corrected pixel block). So, the second coordinate value corresponding to the boundary pixel within the corrected pixel block determines the partial image to be corrected within the image to be corrected. Please refer to FIG. 2 for details of this step. The boundary pixels of the corrected pixel block A (i.e., the pixels included in the dotted-line frame 201) correspond to a plurality of coordinate points in the solid-line frame 202 within the image to be corrected via the coordinate transformation relation established in step 101, and the partial image within the block included in the solid-line frame 202 (i.e., the pixel block A' to be corrected) is the partial image to be corrected by the corrected pixel block A. Next, after the pixel block A' to be corrected is determined, in order to facilitate data buffering of the pixel block A' to be corrected, the present invention further selects a rectangular-shaped pixel block A" to be processed which includes at least the pixel block A' to be corrected. The pixel values of the pixels to be processed within the pixel block A" to be processed provide essential information needed by the interpolation computation used to find out the pixel value of each pixel within the corrected pixel block A.

In step 105, after the pixels included in the pixel block A" to be processed are determined, the present invention further temporarily stores pixel value of each pixel to be processed into a memory device which has a plurality of memory banks (e.g. a static random access memory, SRAM) according to an arrangement relation of a plurality of pixels to be processed within the pixel block A" to be processed, where the buffered pixel values are waiting to be used by the following interpolation computation. This step utilizes a memory allocation technique provided by the present invention, and the main objective of the proposed memory allocation technique is to accelerate the speed of reading the stored pixel values for interpolation computation. Taking a pixel P within the corrected pixel block A for example, the second coordinate position within the image to be corrected is P'. Therefore, when the interpolation computation is computing the pixel value of the pixel P, the pixel values of a plurality of specific pixels (4*4 pixels) to be processed which are adjacent to the point P' and are included in the dotted-line frame 203 (i.e., the pixel block A" to be processed) are used by the interpolation computation. Therefore, the concept of the memory allocation technique of the present invention is to read pixel values of all the specific 4*4 pixels to be processed in one read cycle of the memory device. Thus, the step 105 stores all pixel values into the memory device according to the pixel arrangement relation within the pixel block A" to be processed, and temporarily stores the pixel values of the specific pixels to be processed into different memory banks.

Figure 2:
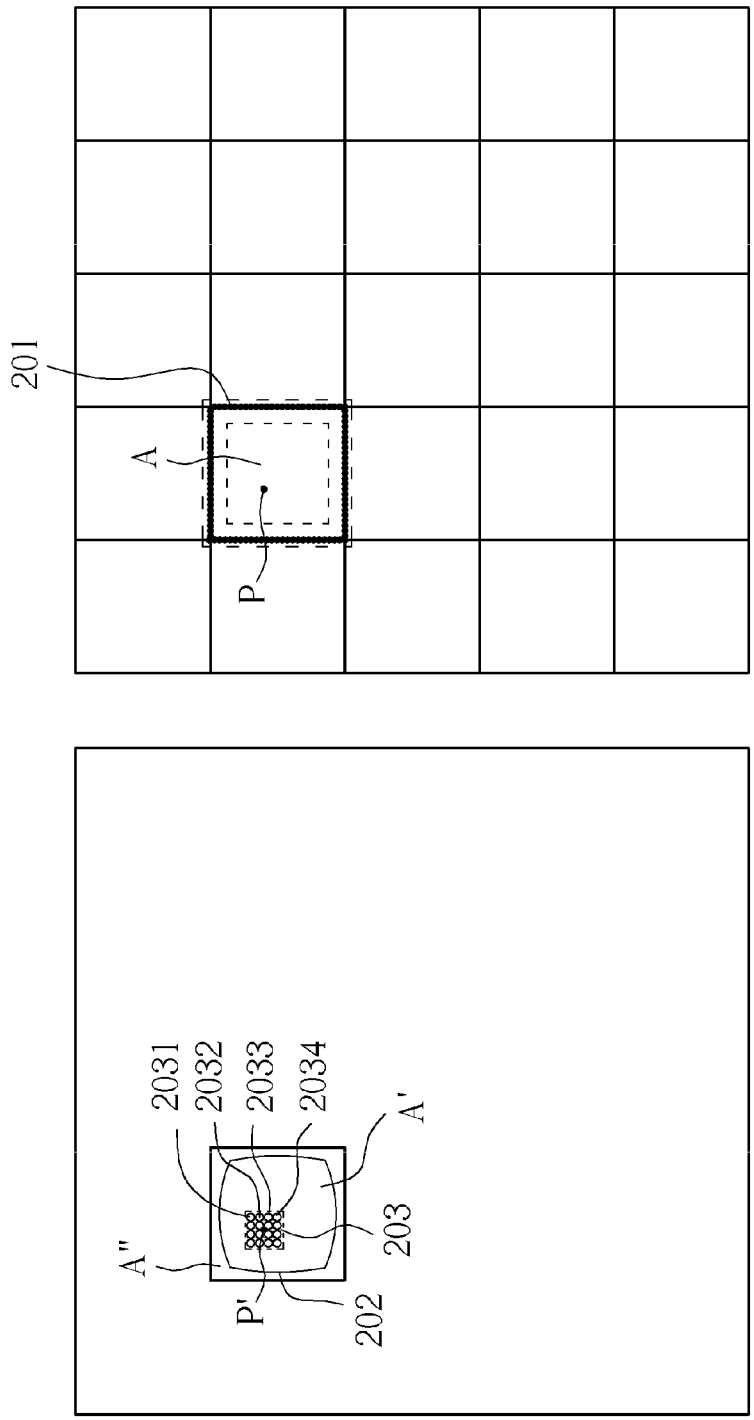
FIG. 2 is a diagram illustrating the exemplary coordinate transformation relation between the image to be corrected and the corrected image according to the present invention.
Figure 3:
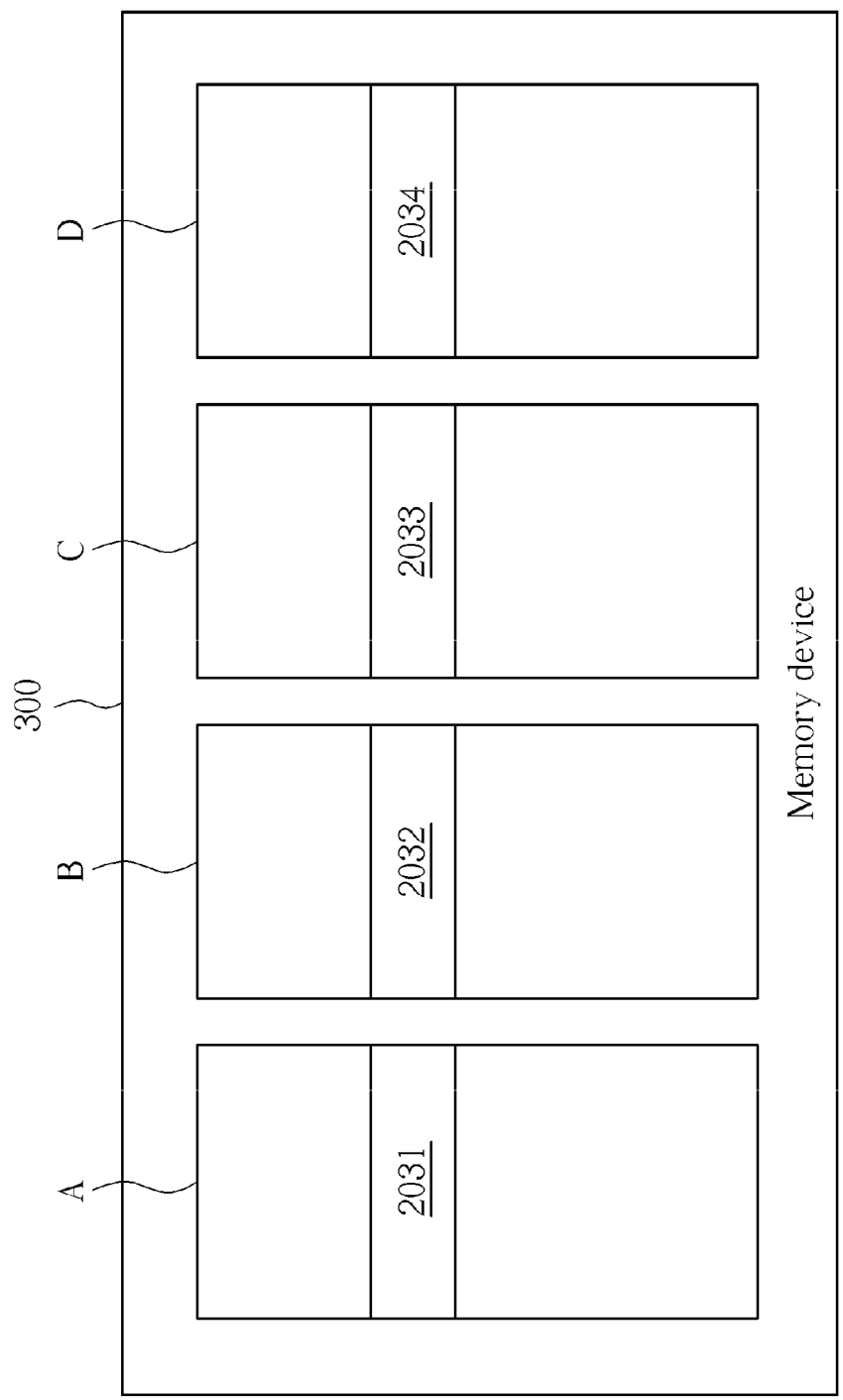
FIG. 3 is a diagram illustrating the exemplary memory configuration according to the present invention.

Please further refer to FIG. 2 and FIG. 3 for further description of the memory allocation technique. As shown in FIG. 2, one interpolation computation requires information of pixel values of 4*4 pixels, so the pixel values of the 4*4 pixels to be processed that are included in the dotted-line frame 203 (i.e., the pixel block A" to be processed) are respectively stored into memory banks A-D of the memory device 300 shown in FIG. 3 according to the row at which the pixels are located. For example, the pixel values of the pixels to be processed that are located at the first row 2031 of the 4*4 pixels to be processed that are included in the dotted-line frame 203 (i.e., the pixel block A" to be processed) will be stored into the memory bank A, and the pixel values of the pixels to be processed that are located at the second row 2032 will be stored into the memory bank B, and the pixel values of the pixels to be processed that are located at the third row 2033 will be stored into the memory bank C, and the pixel values of the pixels to be processed that are located at the fourth row 2034 will be stored into the memory bank D. Please note that the memory configuration manner mentioned above is for illustrative purposes only, and is not meant to be a limitation of the present invention. In general, the characteristics of the memory allocation technique of the present invention include: (1) In the memory device, among a plurality of pixel values of a plurality of specific pixels to be processed during one interpolation computation, pixel values of pixels to be processed that are respectively located at different rows are temporarily stored into different memory banks of the memory device. In other words, as to one block to be processed (i.e., the pixel block A" to be processed), pixel values of pixels located at different rows will not be temporarily stored into different row addresses of the same memory bank, and (2) If the number of the specific pixels to be processed for one interpolation computation is m*n, the number of memory banks of the memory device is m, where m and n are both positive integers. So, the pixel values of the specific pixels to be processed which one interpolation computation requires may be read during one read cycle of the memory device, thereby increasing the processing speed of the interpolation computation. Finally, regarding each corrected pixel, the step 107 first utilizes the second coordinate value (e.g., the coordinate value of the point P") corresponding to the corrected pixel (e.g., pixel P) to determine the specific pixels to be processed (e.g., 4*4 pixels included in the dotted-line frame 203) corresponding to the corrected pixel (e.g., pixel P), and generates a pixel value of the corrected pixel by performing an interpolation computation upon pixel values of the specific pixels to be processed that are read from the memory device.

Please note that the some values are mentioned in above paragraph for illustrative purposes; however, in the present invention, the number of pixels utilized by the interpolation computation is not limited. So, under different design consideration, the number of pixels utilized by the interpolation computation of the present invention may be different.

The steps 101-107 mentioned above represent the process of one pixel value computation of the present invention. A plurality of interpolation computations may be performed for generating pixel values of all corrected pixels within a corrected pixel block. So, after a plurality of pixel value computations are executed, a corrected image with less geometrical distortion is generated when compared with an original image that is not processed by image correction yet.

Figure 4:
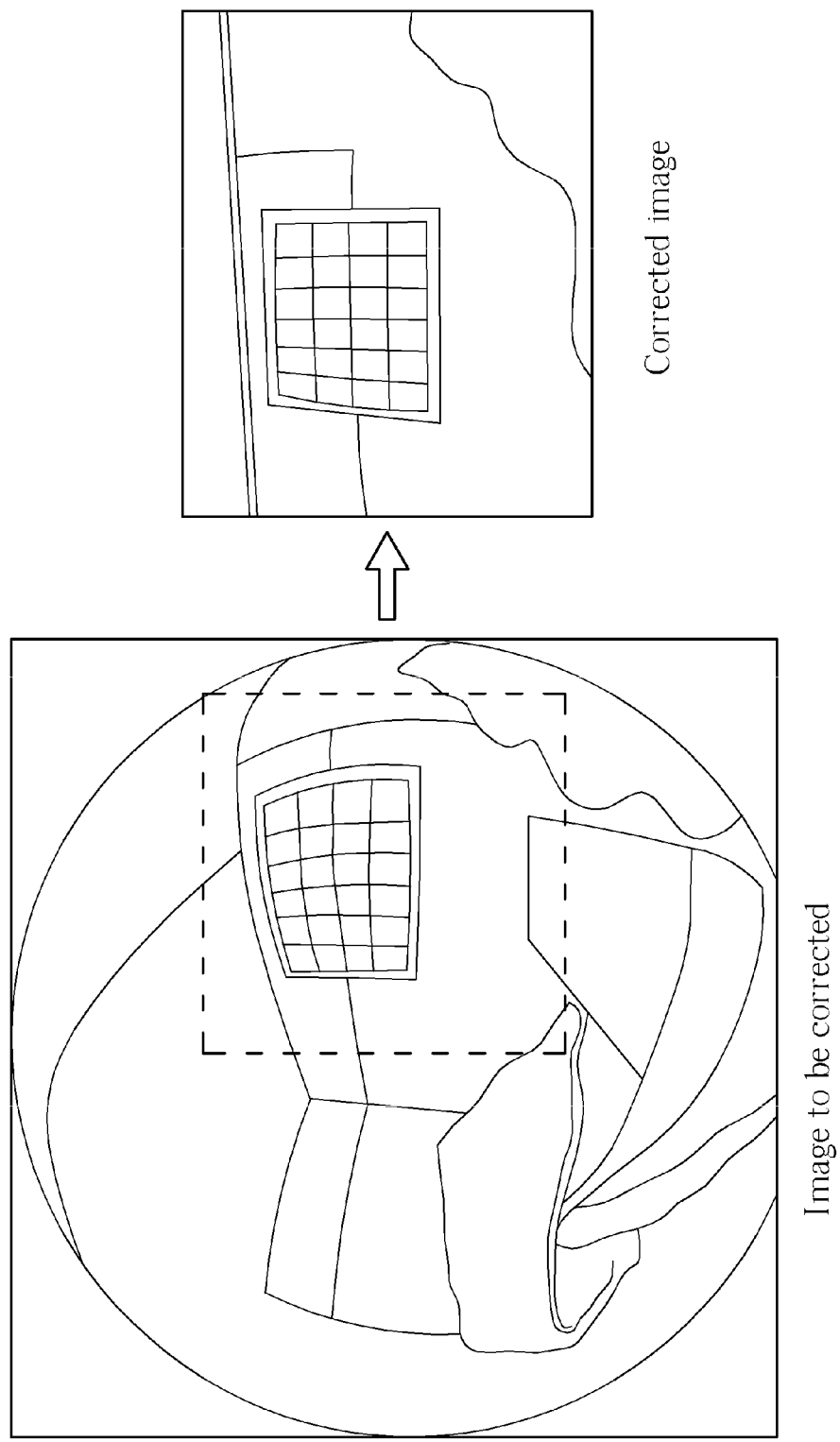
FIG. 4 is a diagram illustrating the exemplary relation between the image to be corrected and the corrected image according to the present invention.

Since the image to be corrected that is captured by a camera with fisheye lens or ultra-wide angle lens includes image information of a large scope, and all of the image information is projected to a comparatively small image sensing area, resulting in obvious geometrical distortion due to the fact that many lines within the original image to be corrected are squeezed and distorted. So the present invention utilizes fisheye distortion correction technique to restore those distorted lines within the original image to be corrected to non-distorted lines. Moreover, when the fisheye lens or the ultra-wide angle lens camera is capturing an image, as the scope of the scene being captured is too large, the scene is not completely parallel within the plane that the image sensing area is located. As a result, the captured image is often accompanied with perspective distortion. In order to solve the problem of perspective distortion, the present invention also restores the original image to be corrected to a non-distorted image through perspective distortion correction technique. So, the image processing method of the present invention performs at least the fisheye distortion correction and the perspective distortion correction. Therefore, the coordinate transformation relation of the present invention is determined by at least the coordinate transformation of fisheye distortion correction and the coordinate transformation of perspective distortion correction. Generally, the aforementioned first coordinate value (Xc, Yc) of the corrected pixel is transformed to the second coordinate value (Xd, Yd) via coordinate transformation of fisheye distortion correction and coordinate transformation of perspective distortion correction. However, in order to more closely meet user's requirements for adjusting images geometrically, the coordinate transformation relation in other exemplary embodiments of the present invention is further determined by scaling coordinate transformation, zoom coordinate transformation, perspective compensation coordinate transformation, vertical and horizontal line compensation coordinate transformation and rotation coordinate transformation, wherein the parameters thereof may be adjusted by the user according to users' visual feeling. For example, if the user feels that the objects displayed in the corrected image are not large enough, the user may choose to adjust proper parameter values of vertical and horizontal scaling ratios, and these parameters will be utilized for scaling the coordinate transformation to affect the whole coordinate transformation relation. In this way, the size and aspect ratio of the corrected image are changed. Moreover, the user may determine which part within the image to be corrected is to be restored. Taking the image to be corrected and the corrected image shown in FIG. 4 for example, as can be seen from FIG. 4, the image data included in the corrected image is only part of the original image to be corrected. Regarding this operation, the user may select a reference center from the image to be corrected, and the position of the selected reference center is referred to for establishing the coordinate transformation relation. After this reference center is determined, only image of a specific scope which is extended from the reference center is restored. So, when the coordinate transformation relation is being established, the corrected pixels located at the most peripheral part of the corrected image only correspond to the boundary part of the specific scope. Therefore, by selecting a different reference center, the user may select the part within the image to be corrected that is desired to be restored.

Figure 5:
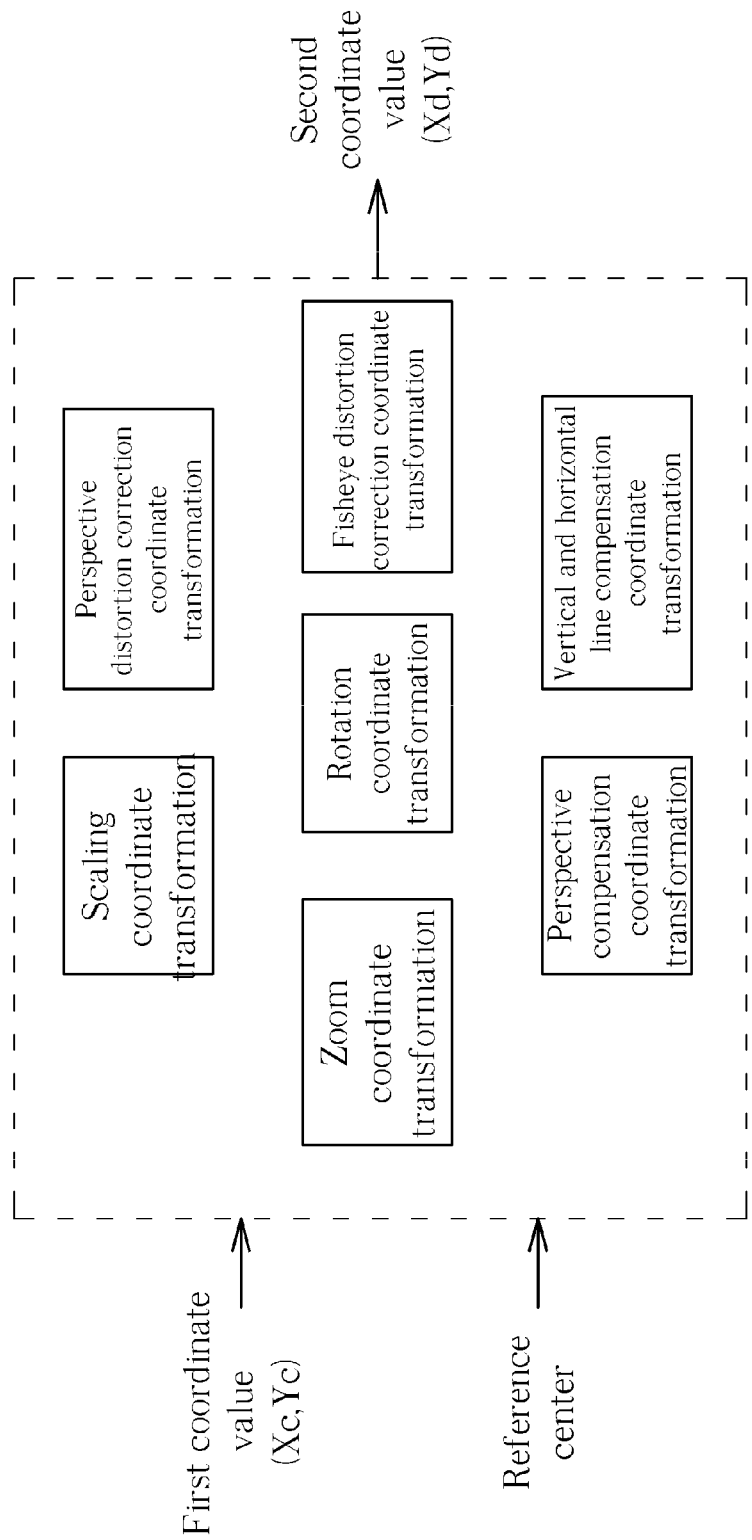
FIG. 5 is a diagram illustrating the determining manner of the coordinate transformation relation according to an exemplary embodiment of the present invention.

FIG. 5 shows the relation between different coordinate transformations and coordinate values. As those skilled in the art can readily understand details of these coordinate transformations, further description is omitted here for brevity.

Figure 6:
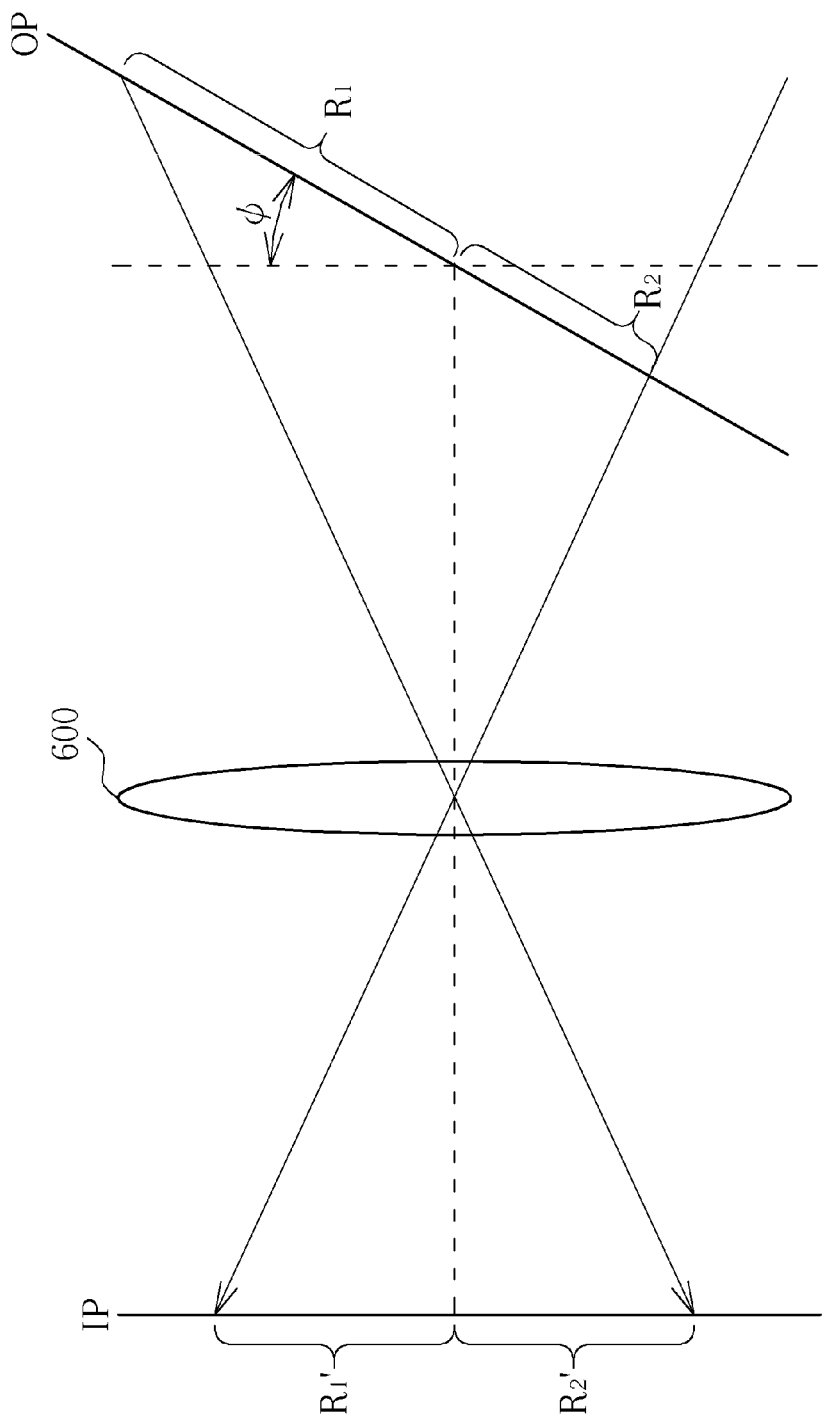
FIG. 6 is a diagram showing the cause of perspective distortion.

Moreover, the present invention particularly provides a simpler estimating method for the parameter utilized in the coordinate transformation of perspective distortion correction, which may improve the efficiency of the image correction process. First, please refer to FIG. 6 which simply shows the cause of perspective distortion. Basically, the cause of perspective distortion is that the object plane OP is not parallel with the image plane IP. Since there is an included angle $\phi$ between the two planes, two segments R1 and R2 which have different lengths in the object plane OP will form segments R1' and R2' which have the same length when projected to the image plane IP through the lens 600. The image on the image plane IP is different from the actual object on the object plane OP, leading to perspective distortion. So, if the perspective distortion is to be corrected, the actual value of the included angle $\phi$ must be known. However, as to the fisheye lens or ultra-wide angle lens, the characteristics of this type of lens are different from that of the general lens. Thus, it is quite difficult to estimate the value of the included angle $\phi$. Therefore, the present invention provides a simpler way for estimating the value of the included angle $\phi$.

Figure 7:
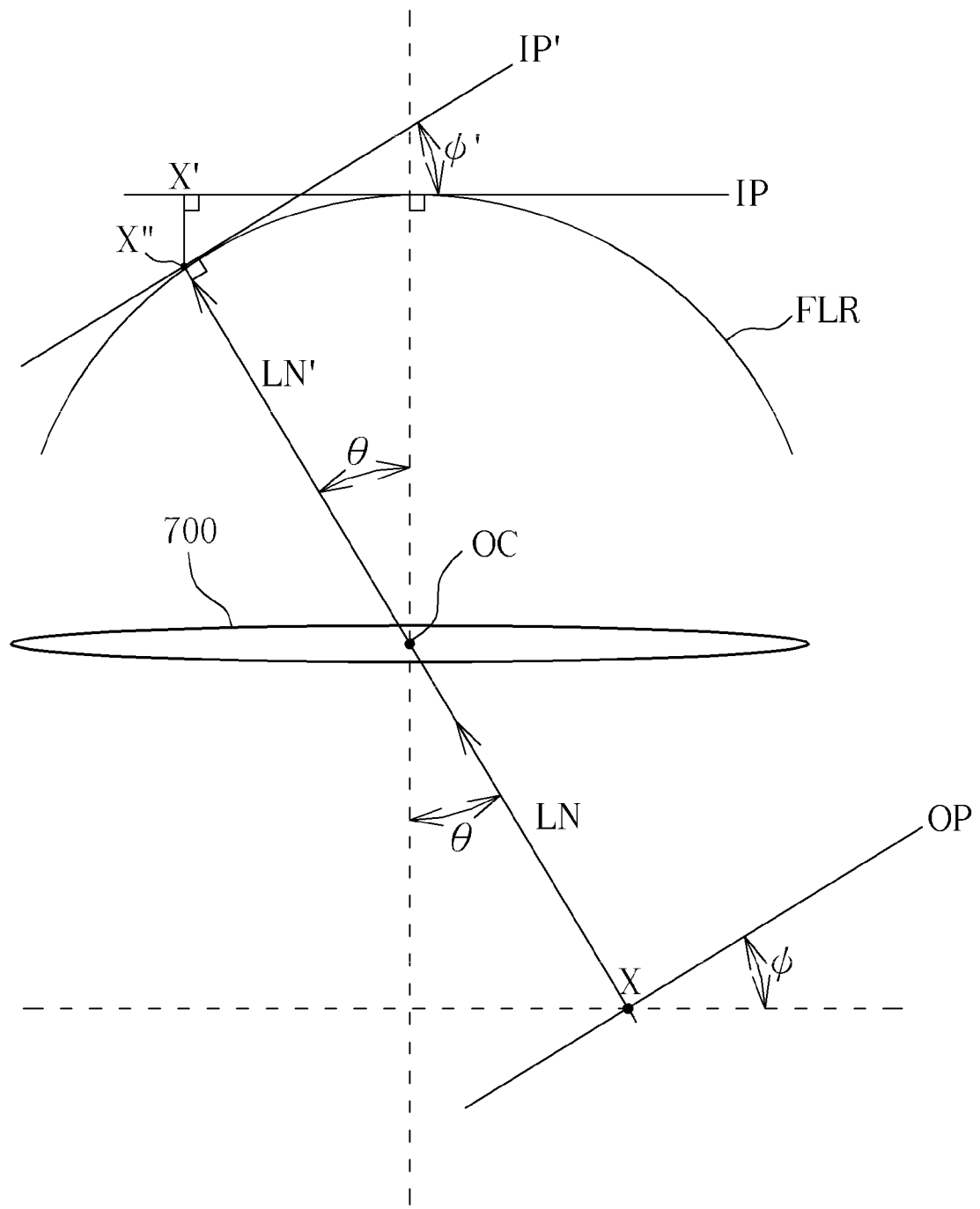
FIG. 7 is a diagram illustrating the principle of the parameter estimation according to an exemplary embodiment of the present invention.

Please refer to FIG. 7 for details of the aforementioned estimating method. As shown in the figure, there is an included angle $\phi$ between the object plane OP and the image plane IP. Theoretically, an incident beam LN originated from a point X of the object plane and passing through the optical center OC of the fisheye lens 600 will form an image at the position X' on the image plane IP. However, if the incident angle $\theta$ of the incident beam LN passing through the optical center OC equals the refraction angle $\theta$ of the refraction beam LN', the refraction beam LN' will intersect with a virtual curved surface FLR at an intersection point X". Therefore, as shown in the figure, the included $\phi'$ between a virtual image plane IP' tangent to the point X" of the virtual curved surface FLR and the original image plane will be equal to the included angle $\phi$ and the incident angle $\theta$. In brief, the present invention employs the virtual curved surface FLR to compensate for the assumption that the relation of the incident angle and the refraction angle of the fisheye lens can be simplified. Therefore, the phenomenon $\phi=\theta$ may be easily utilized for determining the angel parameter $\phi$ required by perspective distortion correction. Besides, the user may further adjust the angle parameter $\phi$ estimated by the aforementioned estimating method according to his/her visual feeling (e.g., user's visual feeling of the corrected image) to improve the accuracy of the angle parameter $\phi$.

Figure 8:
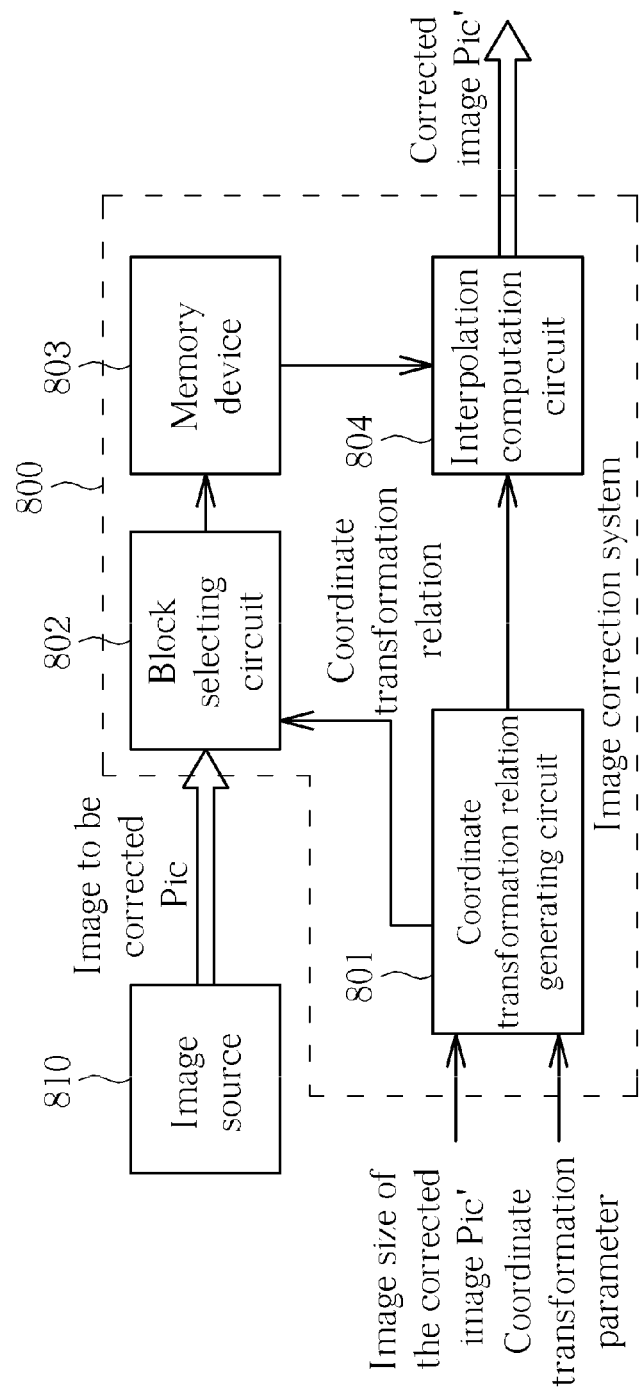
FIG. 8 is a function block diagram illustrating the image correction system according to an exemplary embodiment of the present invention.

The exemplary embodiments of the present invention further provide an image correction system designed according to the aforementioned image correction method. Please refer to FIG. 8, which is a function block diagram of the image correction system 800. As shown in the figure, the image correction system 800 includes a coordinate transformation relation generating circuit 801, a block selecting circuit 802, a memory device 803 and an interpolation computation circuit 804. The image correction system 800 is utilized for outputting a corrected image Pic' according to an image Pic to be corrected that is derived from an image source 810, wherein the image source 810 may be a real-time image captured by a fisheye lens or an ultra-wide angle lens camera, or a static image stored in a storage device. Moreover, the image correction system 800 is utilized for performing a plurality of pixel value calculations, where each pixel value calculation is utilized for generating pixel value of each corrected pixel within one corrected pixel block of the corrected image Pic'. Moreover, the coordinate transformation relation generating circuit 801 is utilized for establishing a coordinate transformation relation between the image Pic to be corrected and the corrected image Pic', such that a first coordinate value of each corrected pixel within the corrected pixel block corresponds to a second coordinate value within the image to be corrected. The coordinate transformation relation generating circuit 801 determines the coordinate transformation relation by referring to the image size of the corrected image Pic' and the coordinate transformation parameters (e.g., the reference center and the angle parameter $\phi$). The block selecting circuit 802 is coupled to the coordinate transformation relation generating circuit 801, and utilized for referring to the coordinate transformation relation to select a pixel block to be processed (which includes at least the pixel block to be corrected) from the image Pic to be corrected. The memory device 803 is coupled to the block selecting circuit 802, and has a plurality of memory banks used for temporarily storing a pixel value of each pixel to be processed, wherein the pixel block to be processed has a plurality of rows of pixels to be processed, and pixel values of pixels to be processed that are located in different rows are temporarily stored in different memory banks of the memory device 803. The memory device 803 may be a static random access memory (SRAM). Moreover, the interpolation computation circuit 804 is coupled to the memory device 803 and the coordinate transformation relation generating circuit 801. The interpolation computation circuit 804 utilizes the second coordinate value corresponding to the corrected pixel for determining a plurality of specific pixels to be processed that correspond to the corrected pixel, reads a plurality of pixel values of the specific pixels to be processed from the memory device 803, and generates a pixel value of the corrected pixel by performing an interpolation computation upon the pixel values of the specific pixels to be processed. Therefore, pixel values of all pixels within the corrected image Pic' may be derived by the image correction system 800 executing a plurality of pixel value computations, and then the image correction system 800 outputs the corrected image Pic'. Since the image correction system 800 is designed according to the aforementioned image correction method, the detailed function and operation principle of each circuit within the image correction system 800 are similar to the image correction method described above. Please refer to above specification paragraphs directed to the image correction method. Thus, further description is omitted here for brevity.

The following only describes features of the coordinate transformation relation generating circuit 801. As the image correction of the present invention requires to perform at least the fisheye correction and the perspective correction, the coordinate transformation relation generating circuit 801 of the present invention includes at least a coordinate transformation circuit of the fisheye correction and a coordinate transformation circuit of the perspective correction (not shown). Generally, the coordinate transformation relation determined by the coordinate transformation relation generating circuit 801 is determined by at least the coordinate transformation circuit of the fisheye correction and the coordinate transformation circuit of the perspective correction. However, in order to more closely meet the user's requirements for adjusting an image geometrically, the coordinate transformation relation generating circuit 801 in other exemplary embodiments of the image correction system of the present invention further includes a scaling coordinate transformation circuit, a zoom coordinate transformation circuit, a perspective compensation coordinate transformation circuit, a vertical and horizontal line compensation coordinate transformation circuit and a rotation coordinate transformation circuit. Please refer to FIG. 5 for the relation between these circuits and the first and second coordinate values. Please note that the present invention does not limit the type and number of the coordinate transformation circuits included in the coordinate transformation relation generating circuit. In other words, under the premise of not departing from the main concept of the present invention, the coordinate transformation relation generating circuit of the present invention may include coordinate transformation types more than or less than that shown in FIG. 5. Besides, the geometrical adjustments available to the user may vary according to the actual design of coordinate transformation relation generating circuit.

In summary, regarding the image captured by a fisheye lens or an ultra-wide angle lens camera, the present invention provides an image correction system and an image correction method which have a favorable computation speed and correction effect. In addition, the user may adjust the corrected image according to personal preference to thereby have best visual experience.

Those skilled in the art will readily observe that numerous modifications and alterations of the device and method may be made while retaining the teachings of the invention.

What is claimed is:

1. An image correction method, for outputting a corrected image according to an image to be corrected, the corrected image comprising a plurality of corrected pixel blocks, the image to be corrected being captured by a fisheye lens camera, the image correction method performing a plurality of pixel value computations, each pixel value computation being utilized for generating a pixel value of each corrected pixel within a corrected pixel block, and comprising:

establishing a coordinate transformation relation between the image to be corrected and the corrected image, such that a first coordinate value of each corrected pixel within the corrected pixel block corresponds to a second coordinate value within the image to be corrected, wherein the coordinate transformation relation is determined by at least a perspective distortion correction coordinate transformation, and in the perspective correction distortion coordinate transformation, an angle parameter corresponding to an object plane and an image plane is determined by an incidence angle of an incident beam corresponding to the image to be corrected, where the incident beam passes through an optical center of the fisheye lens;

according to the coordinate transformation relation, determining a pixel block to be corrected including a plurality of pixels, which corresponds to the corrected pixel block, and selecting a pixel block to be processed which comprises at least the pixel block to be corrected from the image to be corrected; and utilizing the second coordinate value corresponding to the corrected pixel for determining a plurality of specific pixels to be processed that correspond to the corrected pixel, and generating a pixel value of the corrected pixel by performing an interpolation computation upon a plurality of pixel values of the specific pixels to be processed.

2. The image correction method of claim 1, further comprising:
temporarily storing a pixel value of each pixel to be processed into a memory device having a plurality of memory banks, wherein pixel values of pixels to be processed that are located at different rows are temporarily stored into 20different memory banks of the memory device, respectively;
and the step of generating the pixel value of the corrected pixel comprises:
reading the plurality of pixels values of the specific pixels to be processed from the memory device;
wherein the pixel values of the specific pixels to be processed are temporarily stored in different memory banks.

3. The image correction method of claim 2, wherein a number of the specific pixels to be processed is m*n, a number of the memory banks within the memory device is m, grabs continuous n pixels from each memory bank with the same memory address offset to get m by n pixels in one cycle time, and m and n are both positive integers.

4. An image correction system, for outputting a corrected image according to an image to be corrected, the corrected image comprising a plurality of corrected pixel blocks, the image to be corrected being captured by a fisheye lens camera, the image correction system performing a plurality of pixel value computations, each pixel value computation being utilized for generating a pixel value of each corrected pixel within the corrected pixel block, the image correction system comprising:
a coordinate transformation relation generating circuit, for establishing a coordinate transformation relation between the image to be corrected and the corrected image, such that a first coordinate value of each corrected pixel within the corrected pixel block corresponds to a second coordinate value within the image to be corrected, wherein the coordinate transformation relation generating circuit comprises at least a perspective distortion correction coordinate transformation circuit, and the coordinate transformation relation is determined by at least the perspective distortion correction coordinate transformation circuit, and an angle parameter utilized by the perspective distortion correction coordinate transformation circuit and corresponding to an object plane and an image plane is determined by an incidence angle of an incident beam corresponding to the image to be corrected, where the incident beam passes through an optical center of the fisheye lens;
a block selecting circuit, coupled to the coordinate transformation relation generating circuit, for referring to the coordinate transformation relation for determining a pixel block to be corrected including a plurality of pixels, which corresponds to the corrected pixel block, and selecting a pixel block to be processed which comprises at least the pixel block to be corrected from the image to be corrected; and
an interpolation computation circuit, coupled to the coordinate transformation relation generating circuit, the interpolation computation circuit utilizing the second coordinate value corresponding to the corrected pixel for determining a plurality of specific pixels to be processed that correspond to the corrected pixel, and generating a pixel value of the corrected pixel by performing an interpolation computation upon a plurality of pixel values of the specific pixels to be processed.

5. The image correction system of claim 4, further comprising:
a memory device, coupled to the block selecting circuit, the memory device having a plurality of memory banks for temporarily storing a pixel value of each pixel to be processed;
wherein the interpolation computation circuit reads the plurality of pixel values of the specific pixels to be processed from the memory device, and the pixel values of the specific pixels to be processed are temporarily stored in different memory banks.

6. The image correction system of claim 5, wherein a number of the specific pixels to be processed is m*n, a number of the memory banks within the memory device is m, grabs continuous n pixels from each memory bank with the same memory address offset to get m by n pixels in one cycle time and m and n are both positive integers.

* * * * *